March 15, 1960 O. GRIMM 2,928,707

RECORDING AND PRINTING MECHANISM

Filed May 18, 1955

INVENTOR:
OSKAR GRIMM 2,928,707

RECORDING AND PRINTING MECHANISM

Oskar Grimm, Zug, Switzerland, assignor to Landis & Gyr, A.G., Zug, Switzerland, a Swiss body corporate Application May 18, 1955, Serial No. 509,332

3 Claims. (Cl. 346—24)

The invention relates to recording instruments and more particularly to recording instruments, such as electrical ones, in which the incident values are printed on recording tapes.

In such instruments it is frequently desired to have one or more copies of the printed tape for independent use and intermediate evaluation of recorded values at different points in the recording cycle of the quantity being measured. Heretofore this could only be attained by means of a copying-through process wherein the stained reverse side of the recording tape transmitted the values of the recording tape to a copying tape placed underneath it or by means of a carbon strip inserted between the original and a copying tape. However, in practice, great difficulties are encountered with these methods of multiplication, difficulties, occasioned by the necessity for the synchronism of the tapes at the point of impression and of good readability of the copy, impede the separate and independent application and evaluation of original and copy.

The present invention has for its object the elimination of the disadvantages described and the provision of a recording and printing instrument in which one or more clear and readable copies of the printed record may be obtained at any intermediate point in the recording cycle without disturbing the main recording tape. More specifically it is an object of the invention to provide a recording and printing mechanism in which the copying-through process is eliminated and clear, readable copies are made in a positive manner simultaneously with the main tape record.

Briefly, the invention comprises an electric recording and printing arrangement which records the incident values, by means of at least two printing mechanisms arranged parallel to each other, on recording tape in adjacent tracks. Actuating means are provided whereby each printing mechanism simultaneously prints the incident values on their respective tapes. Additionally, a control mechanism is provided which cuts the copy tape at predetermined intervals so that the tape may be removed and observed before the end of the cycle and without disturbing the master tape.

Figures 1, 2:
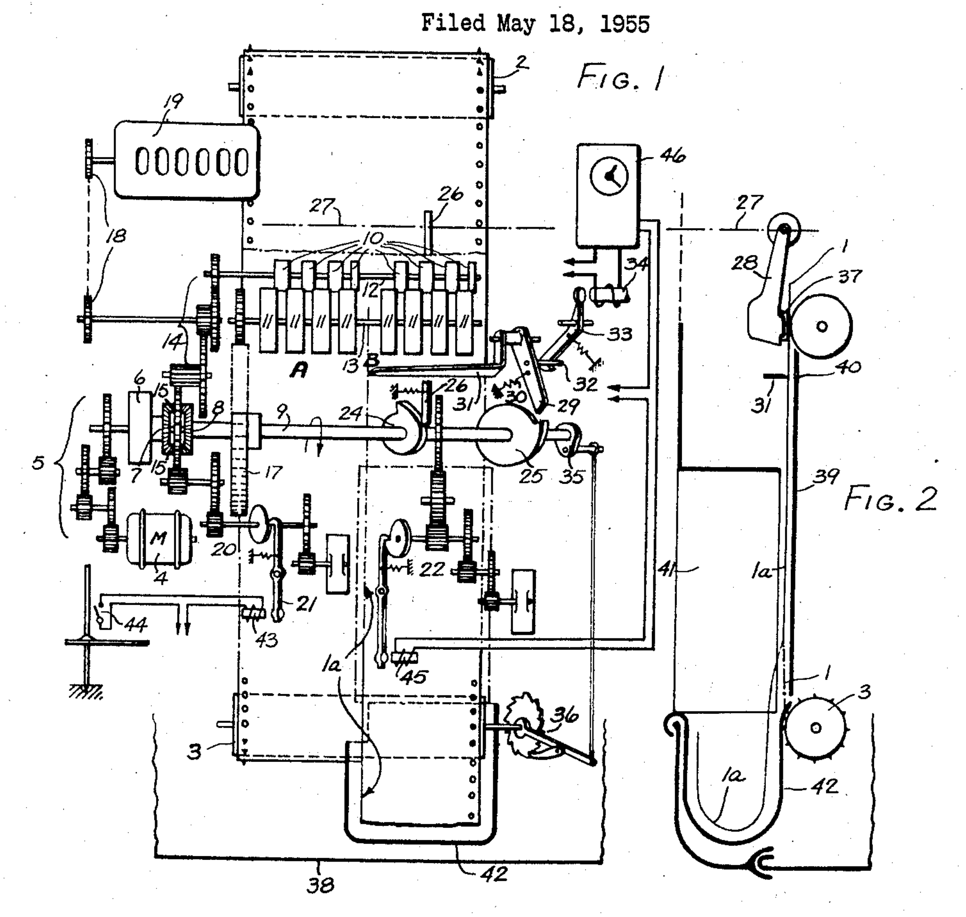
Fig. 1 is a front view of recording and printing mechanism.
Fig. 2 is a side view of a portion of the mechanism shown in Fig. 1.

The illustrative embodiment of the invention shown in the drawings is adapted to be applied to a device in which impulses are recorded on a recording tape by a printing mechanism in definite periods said impulses corresponding in value to a consumption of electric energy expressed by a number.

The numeral 1 indicates a recording tape which is guided in the conventional way from an unwinding roller (not shown) by means of a transporting cylinder 2, in the path in which the recording is to take place. The tape is guided out of this path by means of a second transporting cylinder 3, to be wound again on another roller (also not shown).

The instrument has a motor 4 which acts through the reduction gears 5 on the driving side of a spring mechanism 6. The driven side of this spring mechanism 6 is secured to the sun gear 7 of a differential gearing, the other sun gear being fixed to a distribution shaft 9. In front of the recording path there are arranged coaxially two printing mechanisms A and B whose tens switch gears 10 and printing rollers 11 are each arranged on common shafts 12, 13 shaft 12 effecting the propulsion and shaft 13 the setting-back of the printing mechanisms. The shaft 12 is effectively connected by means of a gear 14 to an epicyclic train of gears 15 of the differential gear carrying the plate gear 16, while the shaft 13 is connected by means of a tooth segment 17 with distribution shaft 9. In front of the gear 14 there also branches off a drive 18 for a summation meter 19. A value impulse release mechanism 20, provided with detent, or lock lever 21, acts on the plate gear 16 and a time impulse mechanism 22, provided with detent, or lock lever, 23, acts on the distribution shaft 9.

Figure 3:
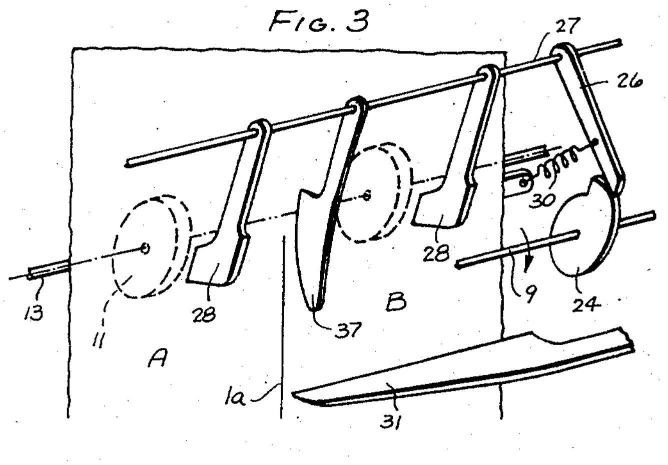
Fig. 3 is a perspective view showing details of the knife structure.

Fixed to the distribution shaft 9 are two drop cams 24 and 25. Cam 24 acts on a lever 26 which is seated on the axis 27 of the hammers 28 (only indicated in Fig. 2 and Fig. 3) and serves to release the strokes of the hammers, while cam 25 acts on an arm 29 of a release mechanism. The arm 29 is biased by a spring 30 and is connected with a knife 31 located below the printing mechanism B and extending across the front of the recording track. Arm 29 is held against the tension of the spring 30 by means of a pin 32 in bolt 33 which is controlled through an electromagnet 34 by a time mechanism 46. The distribution shaft 9 also acts with a crank 35 on a stepping mechanism 36 for the transporting cylinder 3.

A knife 37, operable in the longitudinal direction of the recording tape, is arranged between the hammers 28 of the two printing mechanisms A, B and serves to divide the tape 1 into two tapes. Knife 31 extends up to the path of operation of said knife 37 and completely severs one tape whenever actuated. Between the printing mechanisms A and B and the transporting cylinder 3 there is arranged a plate 39 for guiding the recording tape 1 in the recording track, which at 40 is provided with a slot to produce the cutting effect of knife 31. A similar arrangement (not shown) is provided at the cutting point of the knife 37. Below the distributing shaft 9 and the printing mechanism on the right side there is arranged in the cover of the housing 38 a recess 41 which is open downwardly toward the recording track and followed by a trough.

As is usual in such recording devices the spring mechanism 6 furnishes the operating power for the parts of the operating mechanism of the device, and the motor serves to conserve this force.

During operation the hammers 28 and the knife 37 are located at first at a small distance from the recording tape, the knife 31 is also held by the release mechanisms 25, 29, 30, 32, 33 at a short distance from the recording tape 1 and the electromagnet 34 is unenergized.

The lock lever 21 of the value pulse release means 20 is subject to the action of an electromagnet 43 controlled by the pulse contact of a remote-indication electric meter 44. Due to each indication pulse, the lock lever 21 releases the mechanism for one revolution, so that the numeral printing cylinders 11 and the counter 19 are driven by the spring movement 6 via gears 7, 15, 16, 14, 10 and 18, and advanced by unit value. Shaft 9 and wheel 8 are meanwhile stationary. After elapse of one recording period, i.e., after an indication time of for example 1 hour, the numeral printing cylinders 11 make an impression and are returned, the time pulse mechanism 22 releasing shaft 9 for one revolution. The lock lever 23 is subject to the action of an electromagnet 45 controlled by the timer 46. The same timer 46 also controls electromagnet 34 to release knife 31 for cutting off, which occurs for example once daily. When magnet 34 is energized for this purpose, lever 33 pivots on the shaft shown, and its tooth releases pin 32 on lever 29, so that in the next revolution of shaft 9, cam 25 will actuate knife 31. Knife 31 cannot be controlled directly by timer 46; the direct control must be exercised by shaft 9, in order for the cutting operation to occur after a complete recording cycle, since the last impression made is to be included on the portion cut off.

After somewhat more than a quarter revolution of the distribution shaft 9 the toothed segment 17 begins to act with a gear of the return shaft 13 and resets the printing mechanisms A and B in their zero position. When the distributing shaft 9 has made half a revolution, the crank 35, which until then had acted on the stepping mechanism 36 in an anticipatory manner, moves down the lever and pawl of this mechanism and thus effects the further transmission of the recording tape 1 by means of the transporting cylinder 3.

Shortly before the completion of the revolution of the distribution shaft 9 the cam 25 somewhat raises the arm 29 of the release mechanism 25, 29, 30, 32, 33, which causes the pin 32 to escape the influence of the bolt 33. During the operation described the electromagnet 34 remains unenergized, so that the bolt 33, held by a spring 32' retains the locking position and catches again the arm 29 after the arm 29 has dropped from the cam 25, thus preventing the operation of the knife 31. As long as the solenoid 34 remains unenergized the recording tape 1 is divided into two ends after the values have been recorded in the two tracks.

During the operation of the device the left end of the recording tape 1 is moved over the transporting cylinder 3 while the righthand end 1$^a$ is passed into the trough. When the electromagnet 34 is energized from a time mechanism, the bolt 33 produces no effect on the pin 32 when the arm 29 drops from the cam at the next revolution of the distribution shaft 9, so that it does not stop the arm 29 with the knife and the latter separates the right-hand end 1$^a$ of the tape 1 from the tape 1. Then the end 1$^a$ can be taken out of the trough 42 through the recess 41.

At the end of the next recording period, at which time the time mechanism having become again ineffective on the electromagnet, the cam 25 again takes the knife 31 off the tape 1, and in the release mechanism 25, 29, 30, 32, 33 the knife is again arrested in the position of readiness.

The time mechanism may operate in such a way that the detachment of the end 1$^a$ in question takes place at definite time intervals, say a day or a week, it being unessential whether there is room for this end in the trough or not, if it turns out to be too long on account of too great a time interval it is pushed automatically through the recess 41 towards the exterior and hangs out of the device until it is cut off.

The described construction obtains two completely equivalent recordings of the incident recordings per recording which makes possible an independent use and evaluation at different points of treatment.

Another multiplication, say on three recording tracks, could be employed, that is to say that three printing mechanisms could work together in parallel arrangement and a separation into three ends could be effected, two ends being detached and one wound up in the device.

The separation of the recording tape into ends and their detachment within the device itself is not an absolute condition for the invention. The invention is also applicable where such separation is effected through perforations in the recording tape. However, separations can also be effected quite independently of the construction of the device and the recording tape by cutting up the tape outside the device.

The invention in its broader aspects is not limited to the specific mechanisms shown and described but departures may be made therefrom within the scope of the accompanying claims without departing from the principles of the invention and without sacrificing its chief advantages.

I claim:

1. A recording device for recording incident values in multiplicate in separate tracks on a single recording tape comprising at least two parallelly operating printing mechanisms located in adjacent tracks with respect to the recording tape and interconnected to present identical values for printing, said printing mechanisms each comprising number wheels facing and in close proximity to one surface of the recording tape and hammers facing the opposite surface of said tape, each of said hammers being aligned with one of said wheels for impact-forcing the tape against said wheel and printing said tape with the number of said wheel which at the instant of impact is parallelly facing said tape, means for penetrating said tape having a knife mounted between each pair of printing mechanisms, said knife being operatively connected with said hammers for substantially simultaneous operation therewith to project beyond the plane of impact of said hammers, means for actuating said hammers and knife and thereafter advancing said tape to present another surface for subsequent printing, all at timed intervals, means for measuring said incident values and means responding to said measuring means for turning said number wheels to the position where numbers representing the measured incident values face said tape.

2. A recording device for recording incident values in multiplicate in separate tracks on a single recording tape comprising at least two parallelly operating printing mechanisms located in adjacent tracks with respect to the recording tape and interconnected to present identical values for printing, said printing mechanisms each comprising number wheels facing and in close proximity to one surface of the recording tape and hammers facing the opposite surface of said tape, each of said hammers being aligned with one of said wheels for impact-forcing the tape against said wheel and printing said tape with the number of said wheel which at the instant of impact is parallelly facing said tape, means for penetrating said tape having a knife mounted between each pair of printing mechanisms, said knife being operatively connected with said hammers for substantially simultaneous operation therewith to project beyond the plane of impact of said hammers, means for actuating said hammers and knife and thereafter advancing said tape to present another surface for subsequent printing, all at timed intervals, means for measuring said incident values, means responding to said measuring means for turning said number wheels to the position where numbers representing the measured incident values face said tape, and means for detaching a section of tape carrying one track of recordings at timed recording periods, said detaching means including a cutter positioned to transversely cut through the tape carrying said track to detach said section, said cutter having a spring-biased arm, and a holding mechanism including a cam engaging said arm to restrain said cutter, said cam being operatively connected with the actuating means to release the arm only at the end of a tape advance and a pivoted latch engaging the arm to hold it against spring tension to restrain said cutter and a timing mechanism for actuating said latch to release the arm at the end of a predetermined recording period.

3. In a recording device for recording incident values having means for measuring said values, means transmitting said values to printing means, means for actuating said printing means to produce a record on a recording tape and means for advancing said tape subsequent to each printing to present another surface for printing, the improvement which comprises as the printing means, a plurality of printing mechanisms associated to simultaneously record identical records in adjacent tracks on said tape, said printing mechanisms each comprising number wheels facing and in close proximity to one surface of the recording tape and hammers facing the opposite surface of said tape, each of said hammers being aligned with one of said wheels for impact-forcing the tape against said wheel and printing said tape with the number of said wheel which at the instant of impact is parallelly facing said tape, said hammers being responsive to said actuating means and said number wheels being responsive to said transmitting means to present numbers representing the measured incident values facing said tape and means for penetrating said tape having a knife mounted between each pair of printing mechanisms, said knife being operatively connected with said hammers for substantially simultaneous operation therewith to project beyond the plane of impact of said hammers.

References Cited in the file of this patent

UNITED STATES PATENTS

| | | |
|---|---|---|
| 1,348,791 | Evans | Aug. 3, 1920 |
| 2,005,108 | Pudelko | June 18, 1935 |
| 2,103,566 | Taylor | Dec. 28, 1937 |
| 2,251,312 | Yoder | Aug. 5, 1941 |